United States Patent [19]

Kato et al.

[11] Patent Number: 5,584,713

[45] Date of Patent: Dec. 17, 1996

[54] ELECTRICAL CONNECTOR

[75] Inventors: Syuji Kato, Tsu; Kenji Okura, Hisai, both of Japan

[73] Assignee: Matsushita Electric Works, Ltd., Osaka, Japan

[21] Appl. No.: 352,915

[22] Filed: Dec. 9, 1994

[51] Int. Cl.$^6$ .................................................. H01R 29/00
[52] U.S. Cl. ........................ 439/188; 439/353; 200/51.1
[58] Field of Search ............................. 439/188, 676, 439/500, 660; 200/51.1

[56] References Cited

U.S. PATENT DOCUMENTS

| | | |
|---|---|---|
| 3,470,522 | 9/1969 | Lawrence . |
| 4,762,505 | 8/1988 | Asick et al. ........................ 439/353 |
| 4,798,542 | 1/1989 | Asick et al. ........................ 439/353 |
| 4,842,549 | 6/1989 | Asick et al. ........................ 439/455 |
| 5,234,353 | 8/1993 | Scholz et al. ........................ 439/79 |
| 5,238,422 | 8/1993 | Scherer ........................ 439/188 |

FOREIGN PATENT DOCUMENTS

| | | |
|---|---|---|
| 0601702A1 | 6/1994 | European Pat. Off. . |
| 285002A5 | 10/1983 | German Dem. Rep. . |
| 4041060A1 | 6/1991 | Germany . |
| 4342820A1 | 6/1994 | Germany . |
| 5174905 | 7/1993 | Japan . |

OTHER PUBLICATIONS

Patents Abstracts of Japan; JP 5–174905; E–1451; Dated Oct. 21, 1993; vol. 17/No. 579.

*Primary Examiner*—Gary F. Paumen
*Assistant Examiner*—Jill Demello
*Attorney, Agent, or Firm*—Armstrong, Westerman, Hattori, McLeland & Naughton

[57] ABSTRACT

A connector comprises a socket adapted to be mounted in a potable radiotelephone having an internal power supply and a plug having a power code for supplying electric power from an external power supply to the radiotelephone. The socket has a pair of input terminals, movable and stationary terminals. The movable terminal is formed with a pair of torsion members each of which has a contact. The contacts are urged to the stationary terminal to make a first electrical connection therebetween for allowing a first operation of the radiotelephone with the use of the internal power supply. For preventing an accidental breakage of the first electrical connection which is caused by dust or pieces of thread put between the movable and stationary terminals, a contact-point between one of the contacts and the stationary terminal is displaced from that between the other contact and the stationary terminal in an inserting direction of the plug into the socket. When the plug is connected to the socket, output terminals of the plug are connected to the input terminals to make a second electrical connection therebetween for allowing a second operation of the radiotelephone with the use of the external power supply, and at the same time the first electrical connection can be broken. As a result, it is possible to switch the first operation of the radiotelephone to the second operation thereof by connecting the plug to the socket.

7 Claims, 10 Drawing Sheets

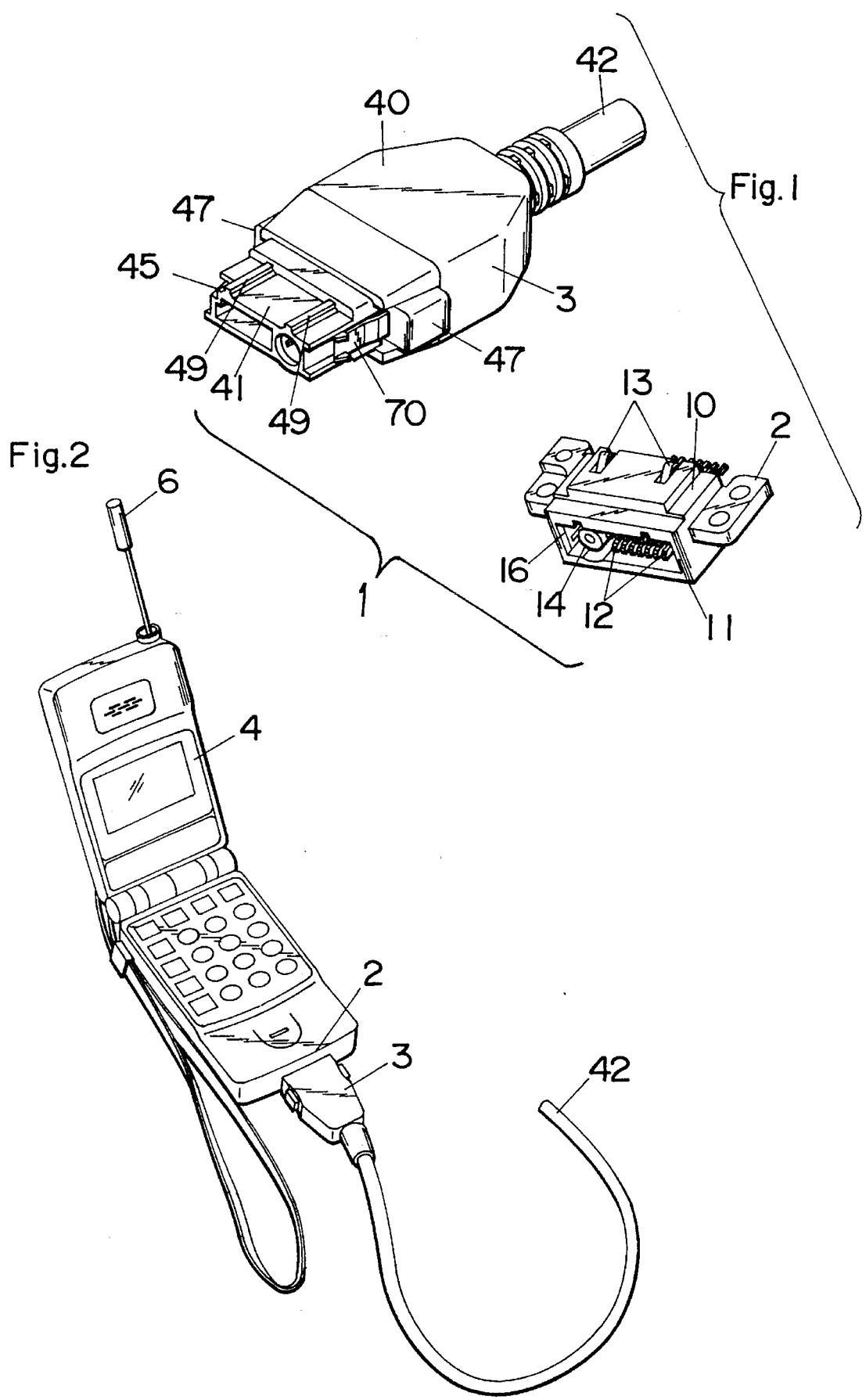

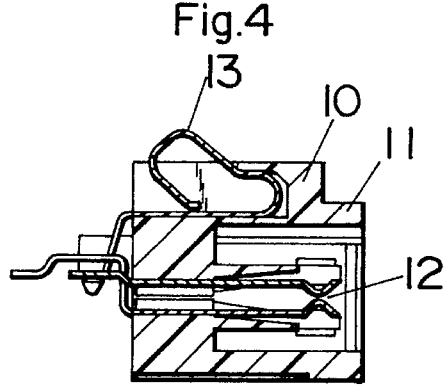
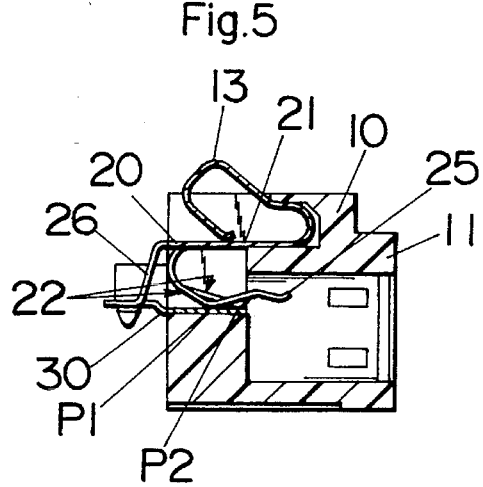
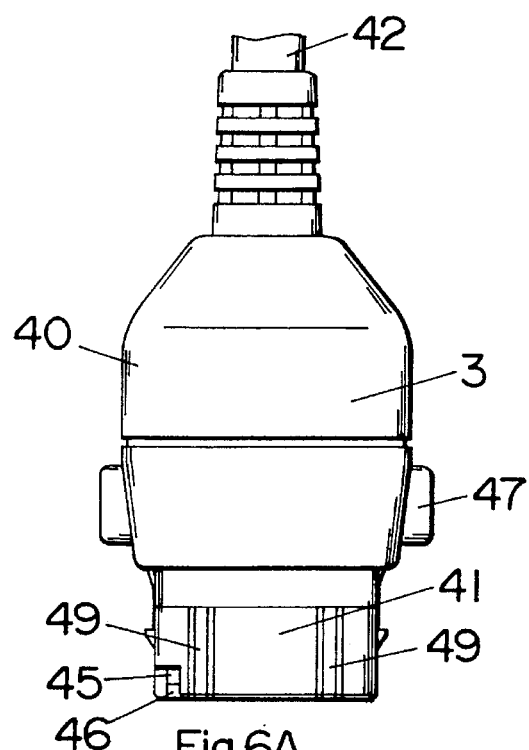
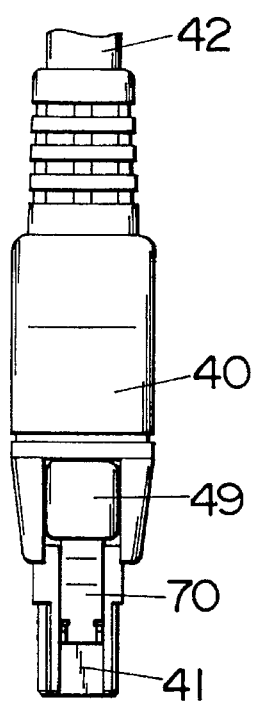
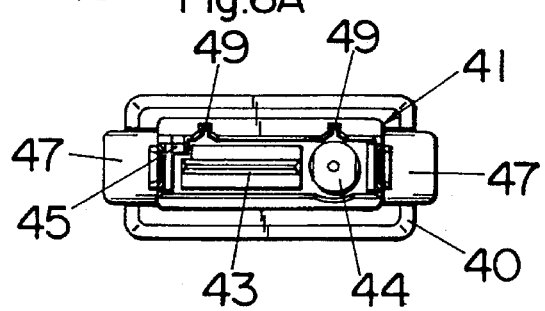

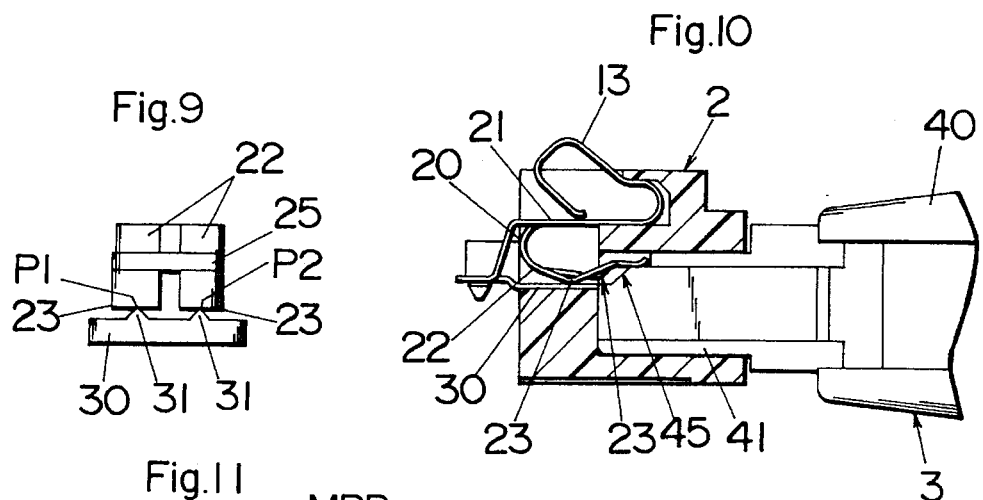
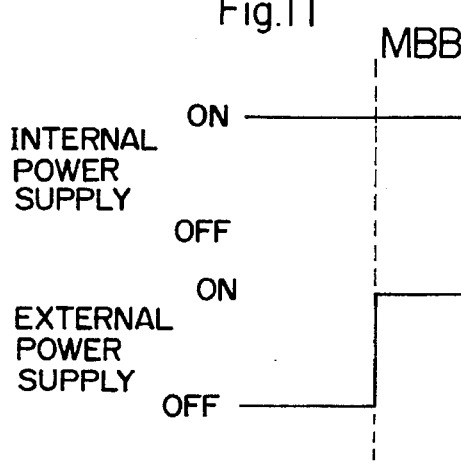
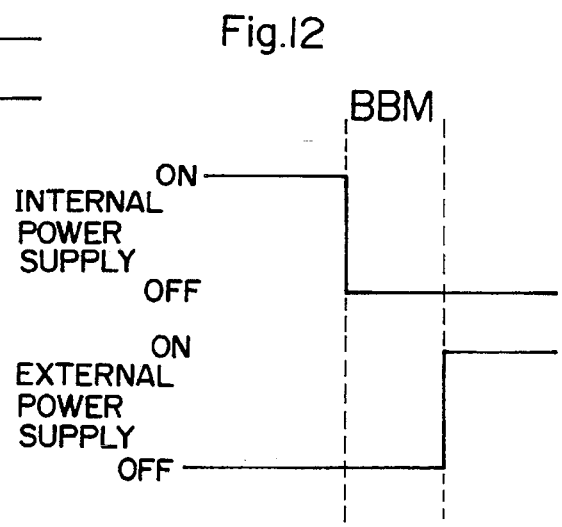
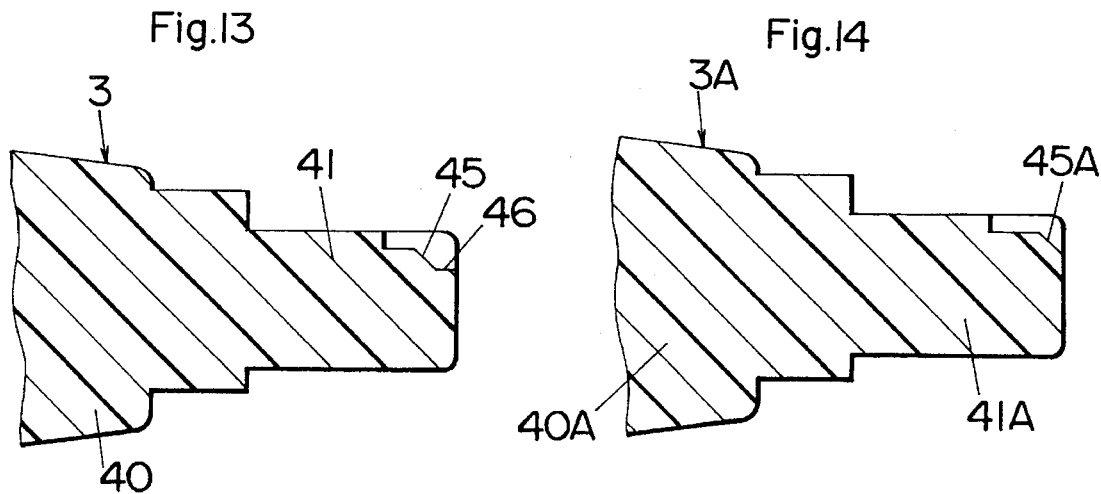

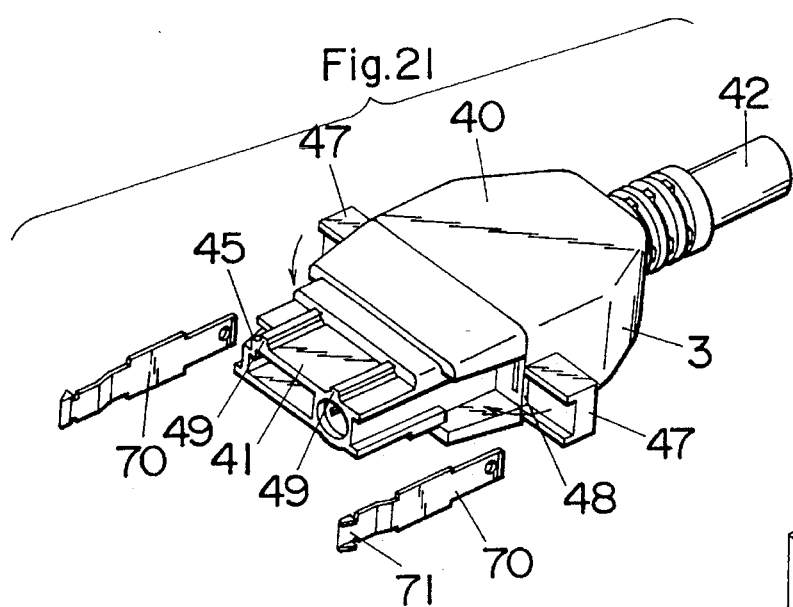
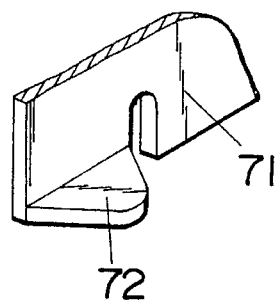
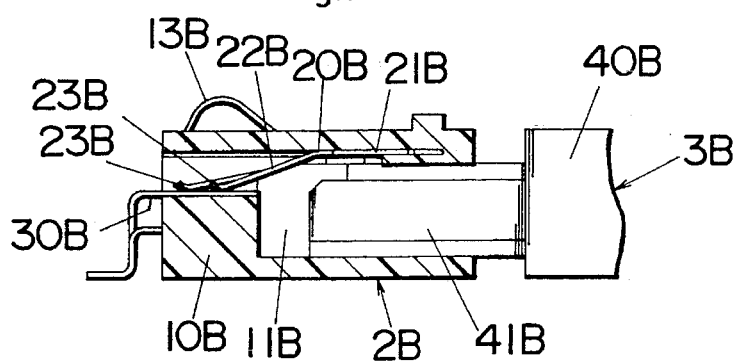
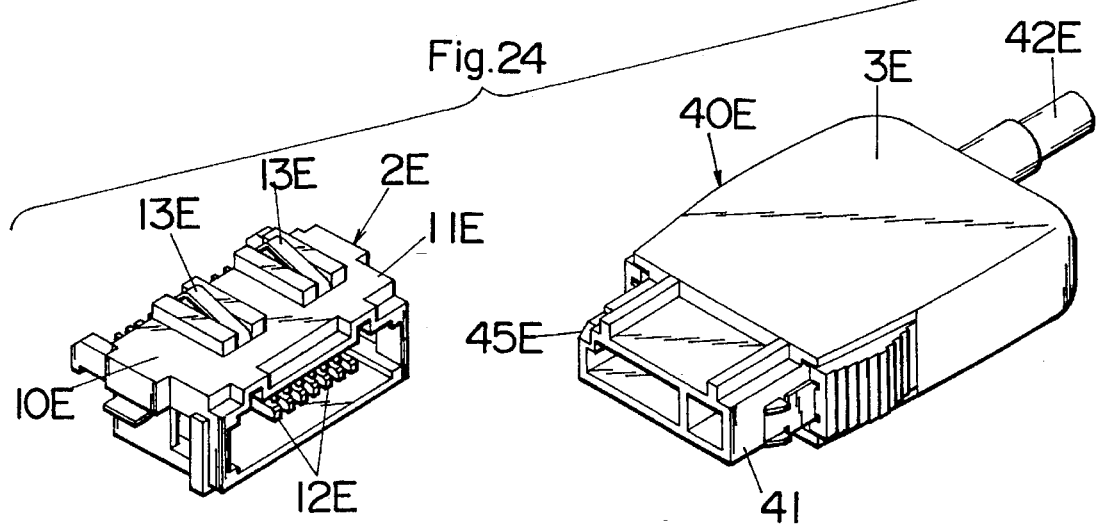
PRIOR ART

ELECTRICAL CONNECTOR

BACKGROUND OF THE INVENTION

1. Field of the Invention

The present invention relates to a connector including a socket and plug for allowing a portable electric appliance having an internal power supply to use an external power supply, and more particularly to a connector capable of switching a first operation of the electric appliance with the use of the internal electric supply to a second operation thereof with the use of the external power supply in response to a connection of the socket with the plug.

2. Disclosure of the Prior Art

A portable electric appliance such as a radiotelephone can be generally operated by an internal power supply, e.g., a rechargeable battery built in the radiotelephone or a battery pack detachably mounted thereon. The internal power supply can be charged by application of a suitable DC charging unit. However, the internal power supply would not always be enough to use the electric appliance continuously for an extended time period. For example, when a portable radiotelephone is used in a car, it would be preferred that the radiotelephone is operated by electric power supplied from an external power supply such as a cigarette lighter socket or fuse box carried in the car without using the internal power supply.

Japanese Patent Early Publication [KOKAI] No. 05-174905 proposes a connector 1E including a socket 2E mounted in a portable radiotelephone 4E having an internal power supply E1 and a plug 3E used for supplying electric power from an external power supply E2. As shown in FIGS. 24 and 26, the socket 2E is formed with a socket housing 10E having a rectangular concave 11E, socket terminals 12E projected in the concave, or recess, 11E, a pair of charging terminals 13E projected on the socket housing 10E, movable terminal member 20 E and a stationary terminal strip 30E. The movable terminal member 20E is formed with a base plate 21E to be fixed on the socket housing 10E, and a torsion arm 22E extending from the base plate 21E. The torsion arm 22E has a movable contact 23E. The stationary terminal member 30E is disposed in the socket housing 10E such that the movable contact 23E is urged against the stationary terminal strip 30E by spring bias of the torsion arm 22E to make a first electrical connection therebetween. Therefore, when the plug 3E is not connected to the socket 2E, it is possible to perform a first operation of the radiotelephone 4E with the use of the internal power supply El, as shown in FIG. 25. Numeral 5E designates a drive circuit of the radiotelephone 4E. The charging terminals 13E are adapted to be connected to a suitable DC charger (not shown) for charging the internal power supply El.

The plug 3E is formed with a plug housing 40E having a rectangular convex, or protrusion 41E, power chord 42E to be detachably connected to the external power supply E2, plug terminals 43E arranged in the convex 41E, and a switch portion 45E formed with an inclined wall of the convex 41E. When the convex 41E of the plug 3E is inserted in the concave 11E of the socket 10 E, a second electrical connection between the socket and plug terminals (12E and 43E) is made to perform a second operation of the radiotelephone 4E with the use of the external power supply E2. At the same time, since the torsion arm 22E is moved along the inclined wall 45E such that the movable contact 23E is spaced away from the stationary terminal strip 30E, as shown in FIGS. 26 and 27, the first electrical connection can be broken in response to the connection of the plug 3E to the socket 2E. In other words, the first operation of the radiotelephone 4E with the use of the internal power supply E1 can be switched to the second operation thereof with the use of the external power supply E2 by connecting the plug 3E to the socket 2E of the radiotelephone 4E.

By the way, in case of using the above explained radiotelephone, there often causes a problem that dust or pieces of thread of a clothing, carpet, or the like, is accidentally put between the movable contact 23E and the stationary terminal strip 30E, so that the first electrical connection is broken to prevent the first operation of the radiotelephone 4E. Particularly, it is confirmed that such a problem is caused by a piece of thread having a length more than about 5 mm and a diameter more than about 20 µm. For example, when a piece of thread having about 20 µm is accidentally put between the movable contact 23E and the stationary terminal strip 30E, it is squeezed by the spring bias of the torsion arm 22E to form a thread sheet having a thickness of about 3 to 5 µm. The first electrical connection is broken by thus formed thread sheet with a considerable probability.

SUMMARY OF THE INVENTION

Therefore, a primary object of the present invention is to provide a connector capable of improving the above problem, and more particularly a connector including a socket to be mounted in an electric appliance having an internal power supply and a plug used for supplying electric power from an external power supply to the electric appliance, which is characterized by an improved terminal member of the socket. That is, the socket comprises a socket housing having a concave, a pair of socket terminals, movable and stationary terminals. The movable and socket terminals are projected in the concave. In the present invention, the movable terminal is formed with a pair of torsion members each of which has a contact. The contacts are urged against the stationary terminal by spring bias of the torsion members to make a first electrical connection therebetween for performing a first operation of the electric appliance with the use of the internal power supply. The contacts are disposed on the torsion members such that a first contact-point between one of the contacts and the stationary terminal is displaced from a second contact-point between the other and the stationary terminal in an inserting direction of the plug into the socket. Therefore, even when one of the first and second contact-points is accidentally broken by dust, pieces of thread or the like, it is possible to maintain the first electrical connection by the other contact-point. In addition, since the first contact-point is displaced from the second contact-point in the inserting direction, the probability of a breakage of the first electrical connection accidentally caused by dust or pieces of the thread would be smaller as compared with the case of using torsion arms having contacts arranged side by side in a line.

The plug comprises a plug housing having a convex, a switch portion formed with an inclined wall of the convex, and plug terminals. The plug terminals are arranged in the convex such that when the convex is inserted into the concave, the plug terminals are connected to the socket terminals to make a second electrical connection therebetween for performing a second operation of the electric appliance with the use of the external power supply. At the same time, since the movable terminal is moved along the inclined wall such that both contacts are spaced away from the stationary terminal, the first electrical connection can be broken in response to the connection of the plug to the socket. In other words, the first operation of the electric appliance can be switched to the second operation thereof by connecting the plug to the socket of the electric appliance.

It is a further object of the present invention to provide a connector capable of performing a MBB(Make Before Break) operation, in which the second electrical connection is made prior to breaking the first electrical connection when the plug is connected to the socket. Therefore, the radiotelephone would not be disconnected during a telephone call by inserting the plug into the socket, or removing the plug from the socket.

In a preferred embodiment of the present invention, the stationary terminal has a pair of pointed projections, to which the contacts of the torsion members are urged, respectively.

It is also preferred that an angle of the inclined wall with respect to the inserting direction is 45 degrees or more.

The above and the other objects, characteristic features and advantages of the present invention will become apparent to those skilled in the art as disclosure is made in the following description of a preferred embodiment of the invention, as illustrated in the accompanying drawings.

BRIEF DESCRIPTION OF THE DRAWINGS

FIG. 1 show perspective views of a socket and plug of a connector of an embodiment of the present invention;

FIG. 2 shows a perspective view of a portable radiotelephone carrying the socket, to which the plug is connected;

FIG. 4 is a cross-sectional view of the socket taken along the line I—I of FIG. 3D;

FIG. 5 is a cross-sectional view of the socket taken along the line II—II of FIG. 3D;

FIGS. 6A to 6C are front, top and side views of the plug of the present invention, respectively;

FIG. 9 illustrates contact-points between the movable terminal member and the stationary terminal strip;

FIG. 10 is a cross-sectional view of the plug connected to the socket of the present invention;

FIG. 11 is a diagram explaining a MBB (Make Before Break) operation;

FIG. 12 is a diagram explaining a BBM (Break Before Make) operation;

FIG. 13 is a partially cross-sectional view of a convex for performing the MBB operation;

FIG. 14 is a cross-sectional view of a convex for performing the BBM operation;

FIG. 21 is a perspective view illustrating the plug and a pair of chucking members;

FIG. 22 is a partially magnified view of the chucking member of FIG. 21;

FIG. 23 is a cross-sectional view of a socket of a modification of the embodiment of the present invention;

FIG. 24 is a perspective view of a connector of the prior art;

DESCRIPTION OF THE PREFERRED EMBODIMENT

Figure 3B:
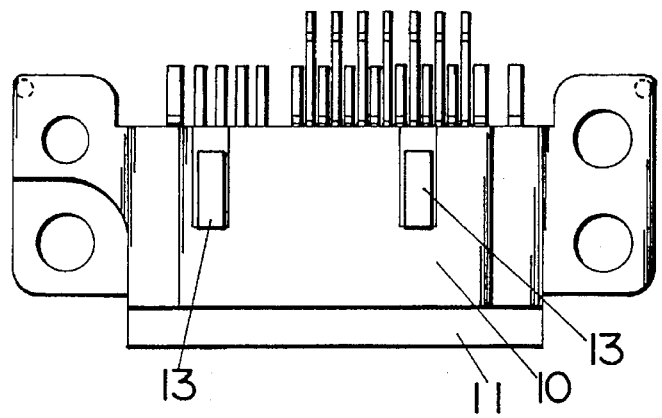
FIGS. 3A to 3D are front, top, side and rear views of the socket of the present invention, respectively.
Figure 3A:
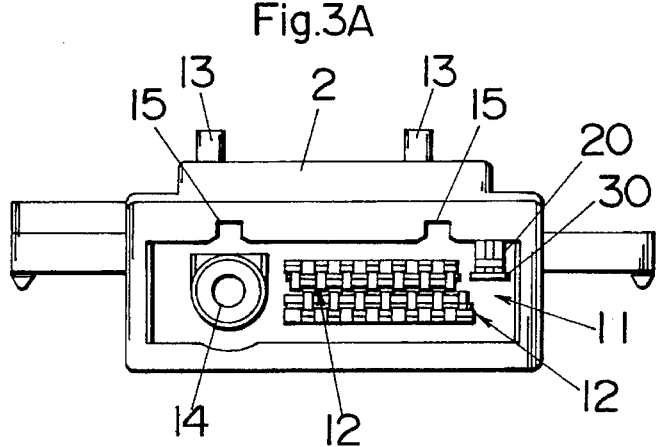
Figure 3C:
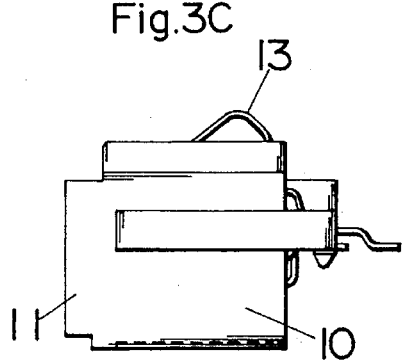
Figure 3D:
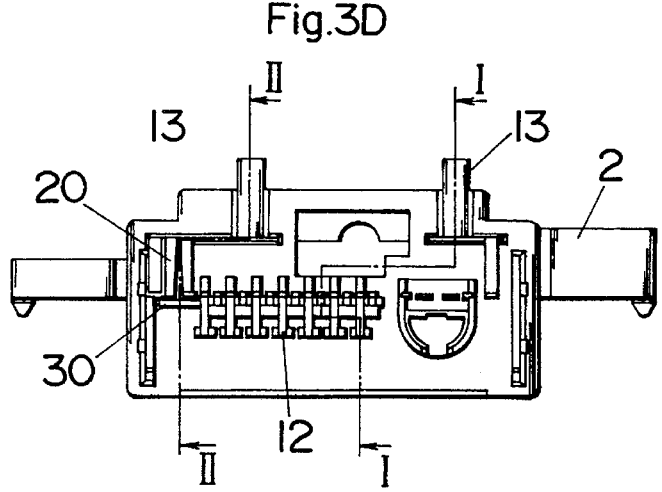
Figure 7A:
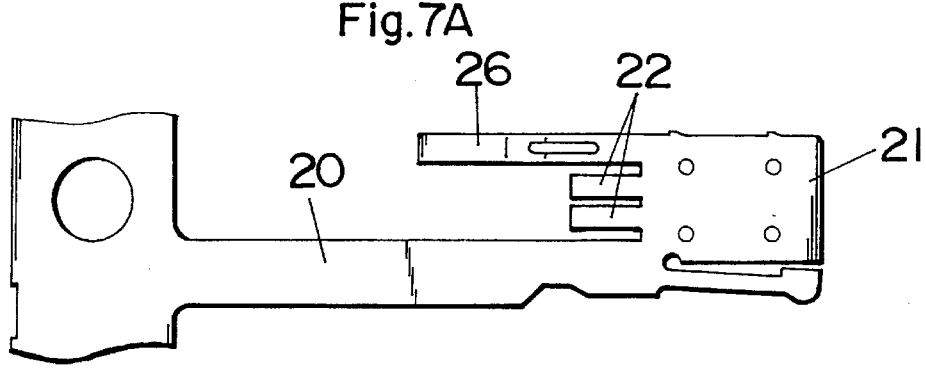
FIGS. 7A to 7C are top, side and bottom plan views of a movable terminal member of the present invention, respectively.
Figure 7B:
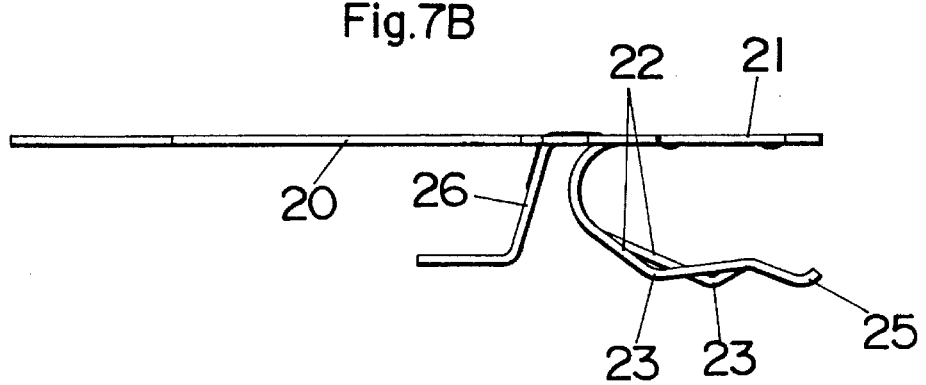
Figure 7C:
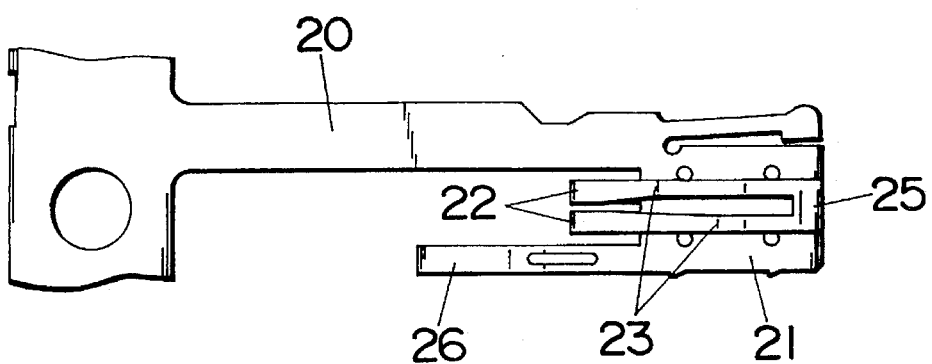
Figure 8A:
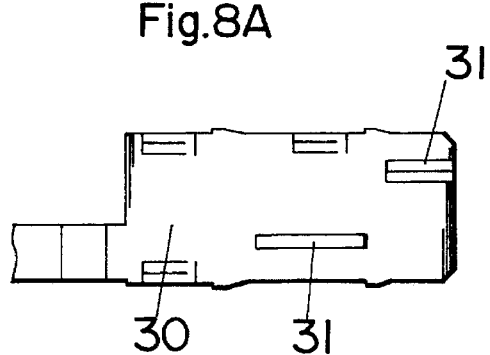
FIGS. 8A and 8B are top and end views of a stationary terminal strip of the present invention, respectively.
Figure 8B:
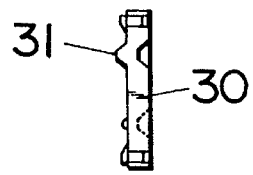

Referring to FIGS. 1 to 22, a connector 1 of the present invention is explained in this embodiment. The connector 1 comprises a socket 2 mounted in a portable radiotelephone 4 having an internal power supply such as a Ni-Cd rechargeable battery, and a plug 3 having a power chord 42 used for supplying electric power from the external power supply to the radiotelephone 4, as shown in FIG. 1. The connector 1 is capable of switching a first operation of the radiotelephone 4 with the use of the rechargeable battery to a second operation thereof with the use of an external power supply, e.g., a cigarette lighter socket carried in a car in response to a connection of the plug 3 to the socket 2, as shown in FIG. 2. The socket 2 is formed with a socket housing 10 having a rectangular concave, or recess 11, socket terminals 12 including a pair of input terminals for receiving the electric power, an antenna socket 14, a pair of charging terminals 13 to be fixed on the socket housing 10, a movable terminal member 20, and a stationary terminal strip 30, as shown in FIGS. 3A to 3D. The socket terminals 12 and the antenna socket 14 are arranged in the concave 11. The movable terminal member 20 is formed with a base plate 21 to be fixed to the socket housing 10, a pair of torsion arms 22 extending from the base plate 21, an engaging tip 25 formed at top ends of the torsion arms 22, and a lead arm 26 to be soldered on a circuit board to connect with an electrode of the rechargeable battery. Each of the torsion arms 22 has a contact 23, which are disposed such that a first contact-point P1 formed between one of the contacts 23 and the stationary terminal strip 30 is displaced from a second contact-point P2 formed between the other contact 23 and the stationary terminal strip 30 in a longitudinal direction of the movable terminal member 20, as shown in FIGS. 5 and 7A to 7C. The longitudinal direction corresponds to a direction of inserting the plug 3 into the socket 2. The stationary terminal strip 30 has a pair of elongate projections 31 having a triangular cross-section, as shown in FIGS. 8A and 8B. The stationary terminal strip 30 is disposed in the socket housing 10 such that the contacts 23 are urged against top edges of the projections 31 by spring bias of the torsion arms 22, respectively, as shown in FIG. 9, to make a first electrical connection between the movable terminal member 20 and the stationary terminal strip 30. Therefore, when the plug 3 is not connected to the socket 2, it is possible to perform the first operation of the radiotelephone 4E. The same circuit pattern as the prior art, that is, the circuit diagram of FIG. 26, can be adopted in this embodiment. The charging terminals 13 are adapted to be connected to a suitable DC charger for charging the rechargeable battery.

The plug 3 is formed with the power chord 42, a plug housing 40 having a rectangular convex protrusion 41, plug terminals 43 including a pair of output terminals for supplying the electric power, an antenna plug 44, and a switch portion formed with an inclined wall 45 of the convex 41, as shown in FIGS. 6A to 6C. The plug terminals 43 and antenna plug 44 are arranged in the convex 41. When the convex 41 of the plug 3 is inserted in the concave 11 of the socket 2, a second electrical connection between the plug and socket terminals (12 and 43) is made to perform the second operation of the radiotelephone. At the same time, the engaging tip 25 of the movable terminal member 20 is pushed up along the inclined wall 45 such that the contacts 23 are spaced away from the stationary terminal strip 30 to break the first electrical connection, as shown in FIG. 10. Therefore, the first operation of the radiotelephone 4 can be switched to the second operation thereof only by connecting the plug 3 to the socket 2.

In this embodiment, the inclined wall 45 is formed such that the second electrical connection is made prior to braking the first electrical connection, as shown in FIGS. 11 and 13. That is, when the convex 41 of the plug 3 is inserted into the concave 11 of the socket 2, since the engaging tip 25 of the movable terminal member 20 is firstly moved along on a horizontal wall 46 extending forwardly of the inclined wall 45, the second electrical connection can be made without braking the first electrical connection. This switching operation is called a MBB (Make Before Break) operation. In the MBB operation, it is possible to prevent an inconvenience that the radiotelephone 4 is disconnected when the plug 3 is inserted to or removed from the socket 2. On the contrary, when it is necessary to take a BBM (Break Before Make) operation, in which the first electrical connection is broken prior to making the second electrical connection, it is preferred to use a convex 41A having an inclined wall 45A without such a horizontal wall 46, as shown in FIGS. 12 and 14. In the BBM operation, it is possible to reset the radiotelephone 4 when the plug 3 is inserted to or removed from the socket 2.

Figure 15:
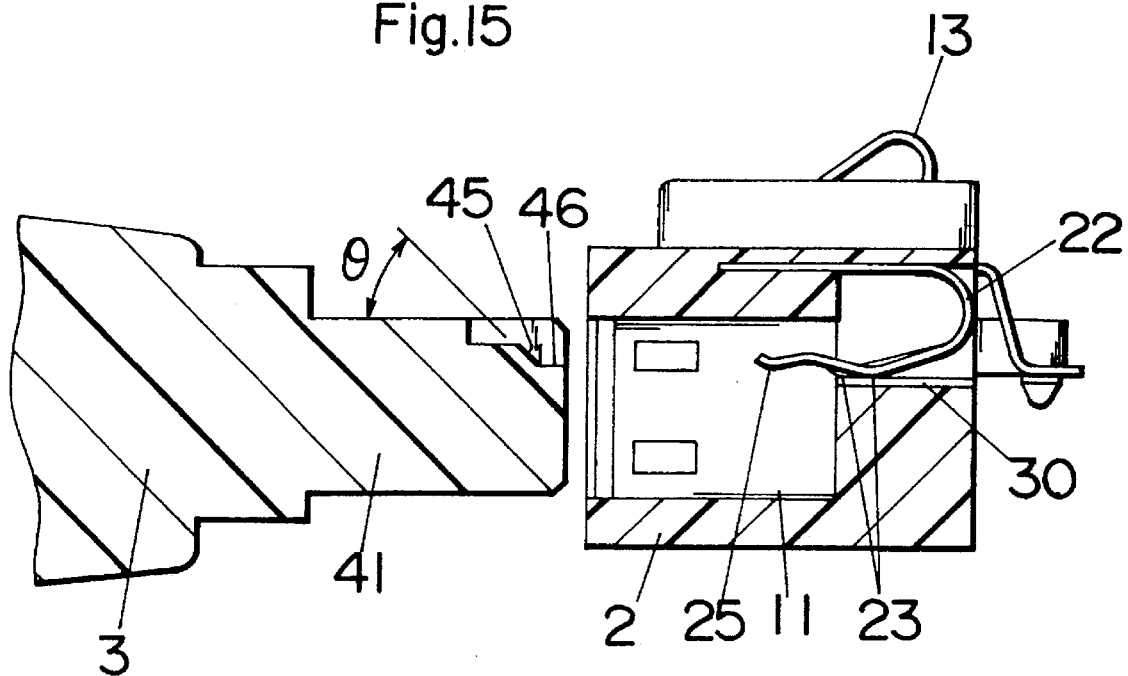
FIG. 15 explains an angle 0 of an inclined wall to a horizontal wall of the convex of FIG. 13.
Figure 16:
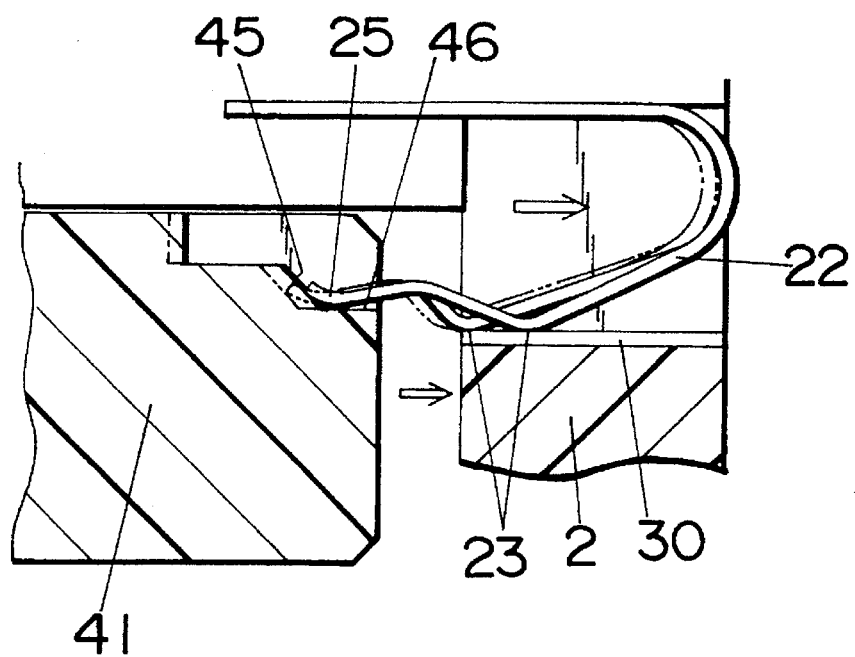
FIG. 16 explains a cleaning effect found between the stationary terminal strip and the movable terminal member.

In addition, it is preferred that an angle of the inclined wall 45 to the horizontal wall 46, which is defined as θ in FIG. 15, is 45 degrees or more. When the plug 3 is connected to the socket 2, since the inclined wall 45 pushes the engaging tip 25 of the movable terminal member 20 in the direction indicated by the arrow in FIG. 16, so that the contacts 23 firstly are slid on the top edges of the projections 31 of the stationary terminal strip 30 over a wiping travel while keeping the first electrical connection, and then is moved upwardly along the inclined wall 45 to break the first electrical connection. As the angle of the inclined wall increases, the wiping travel is more extended. Since the extension of the wiping travel presents a cleaning effect between the top edges of the projections 31 and the contacts 23, it is possible to make fresh contact-points therebetween.

Figure 17:
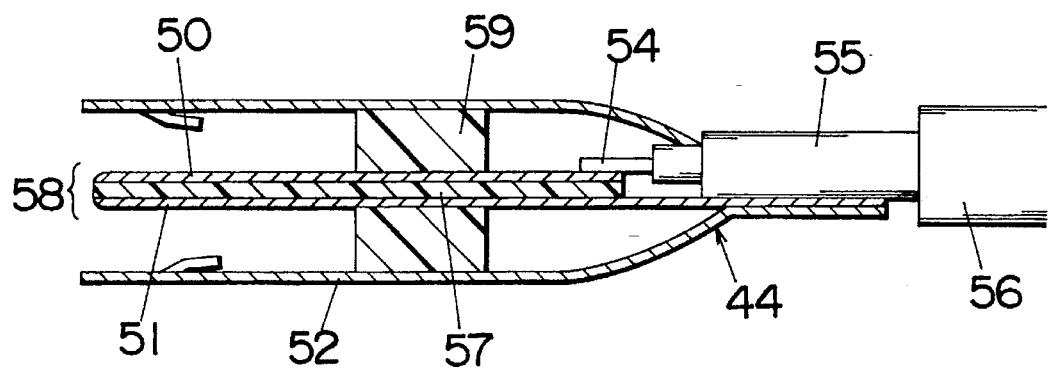
FIG. 17 is a cross-sectional view of an antenna plug.
Figure 18:
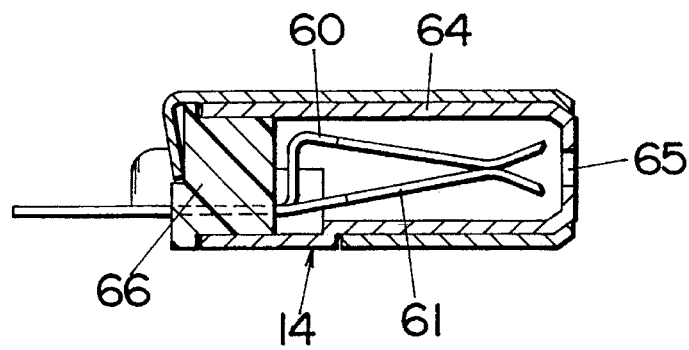
FIG. 18 is a cross-sectional view of an antenna socket.
Figure 19:
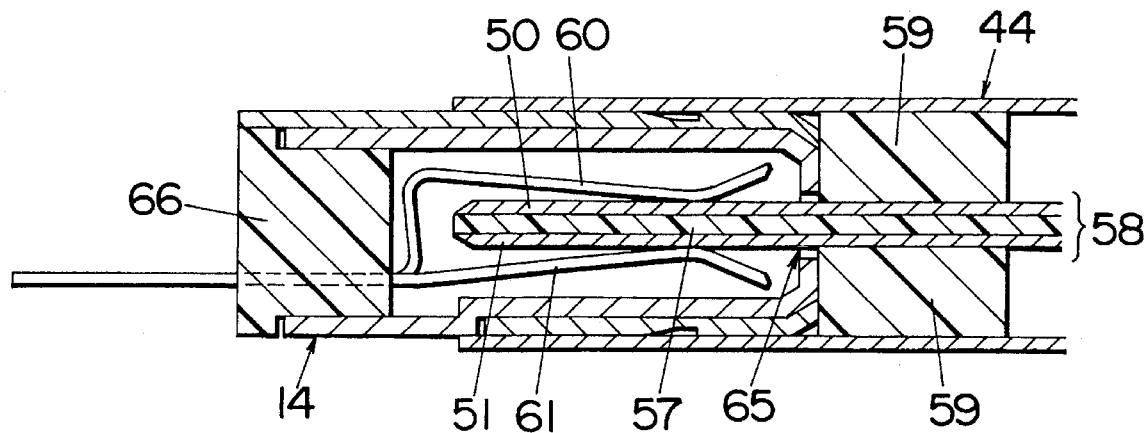
FIG. 19 is a cross-sectional view of the antenna plug connected to the antenna socket.

The socket terminals 12 except for the input terminals and the plug terminals 43 except for the output terminals are used to receive or transmit a phone signal through a telephone line, as shown in FIG. 4. The antenna socket 14 and antenna plug 44 are used to switch between the use of an internal antenna 6 of the radiotelephone 4 and the use of an external antenna (not shown) carried in a car. The antenna plug 44 is formed with a NO terminal 50 connected to a center conductor 54 of a coaxial cable 56, a shield terminal 51 and cylindrical tube 52 which are connected to an outer conductor 55 of the coaxial cable 56, as shown in FIG. 17. The NO and shield terminals (50 and 51) are integrally formed by putting an insulating layer 57 therebetween to form a projected pin 58 in the cylindrical tube 52. The pin 58 is fixed at the center of the cylindrical tube 52 by the use of an insulating fixture 59. On the other hand, the antenna socket 14 is formed with a common terminal 60, a NC terminal 61, a shield case 64 having a top opening 65, as shown in FIG. 18. The common and NC terminals (60 and 61) are fixed in the shield case 64 by an insulating cap 66 such that the common terminal 60 is urged against the NC terminal 61 to make a NC-common connection therebetween. When the plug 3 is connected to the socket 2, the pin 58 is engaged with the common and NC terminals (60 and 61) through the top opening 65 of the shield case 64 such that the common terminal 60 is connected to the NO terminal 50, and the NC terminal 61 is connected to shield terminal 51 to maintain at the earth potential, as shown in FIG. 19.

Figure 26:
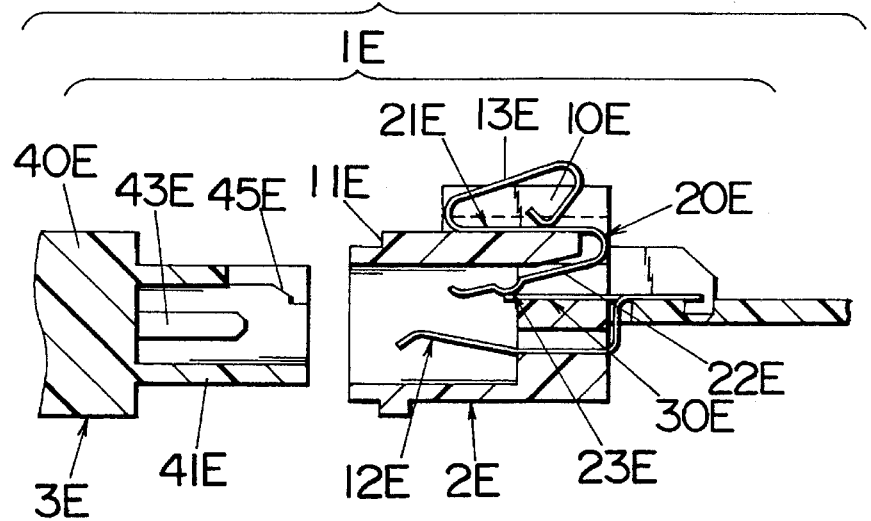
FIG. 26 shows cross-sectional views of a socket and plug of the connector of the prior art.
Figure 27:
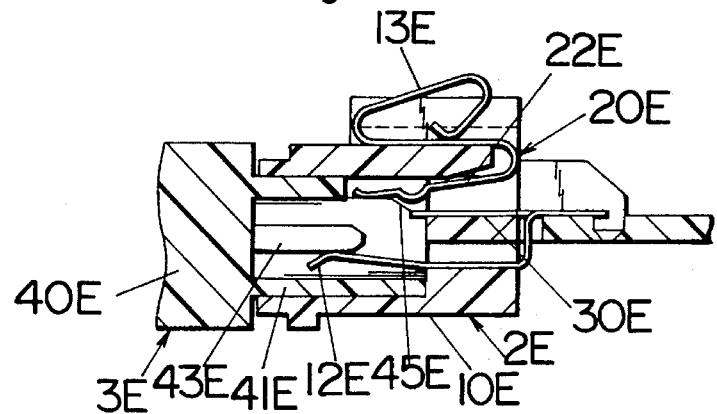
FIGS. 27 is a cross-sectional view of the plug connected to the socket of the prior art.

In comparison with a connector 1E of the prior art, which makes a first electrical connection between a movable terminal member 20E and stationary terminal strip 30 E through a single contact-point, as shown in FIG. 26, the connector 1 having the twin contact-points (P1 and P2) of the present invention can reduce the probability of a breakage of the first electrical connection caused by dust or pieces of thread accidentally put therebetween. For investigating a minimum size of a piece of thread which can brake the first electrical connection, insulating sheets having different thicknesses were put between the movable terminal member 20 and stationary terminal strip 30, while observing electrical conductivity therebetween by the use of a tester. In the connector 1 of the present invention, when one of the contacts 23 is spaced away from the stationary terminal strip 30 by the insulating sheets, it is possible to maintain the first electrical connection by the other contact 23. However, since the torsion arm 22 having the contact 23 are integrally formed with that having the other contact 23 through the base plate 21, when an insulating sheet having a thickness more than 65 μm is put between one of the contacts 23 and the stationary terminal strip 30, it was confirmed in this investigation that both contacts 23 are spaced away from the stationary terminal strip 30 to brake the first electrical connection. On the other hand, in case of the connector 1E of the prior art, it is needless to say that since the first electrical connection is made only by the single contact-point, it can be broken readily by a thinner insulating sheet.

Figure 20A:
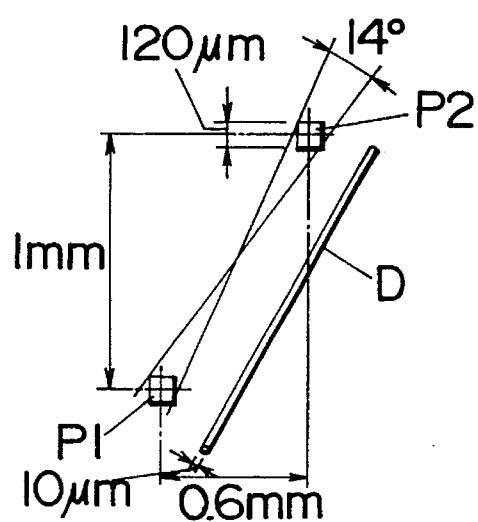
FIGS. 20A and 20B are diagrams for explaining arrangements of first and second contact-points, respectively.
Figure 20B:
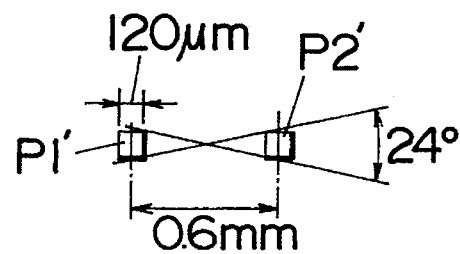
Figure 25:
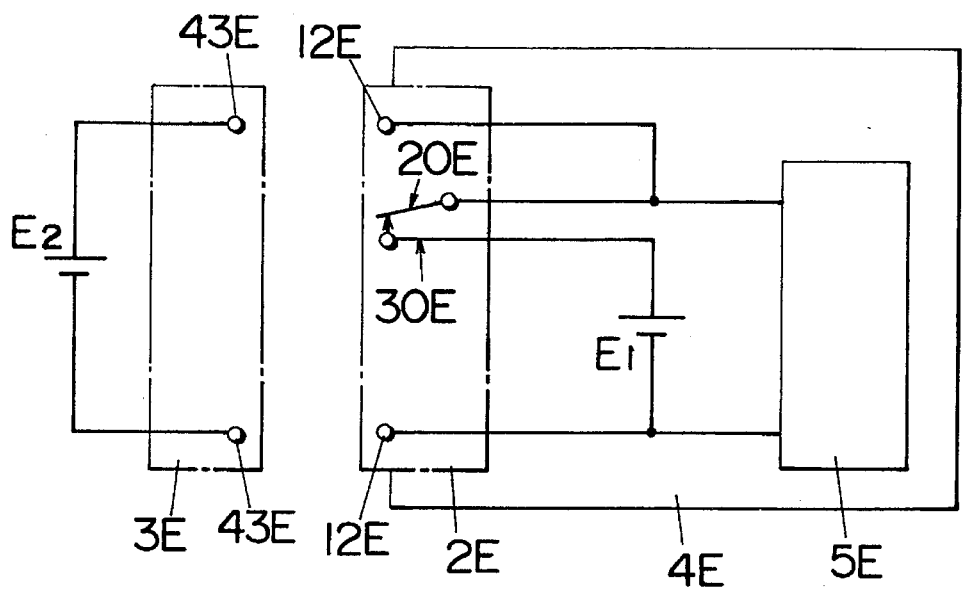
FIG. 25 is a circuit diagram of the prior art.

In addition, since the contact-points (P1 and P2) are arranged such that the first contact-point P1 is displaced from the second contact point P2, as shown in FIG. 20A, it is possible to reduce the probability of putting a piece of thread D having the diameter of about 10 μm between the stationary terminal strip 30 and the contacts 23, in comparison with a case of arranging contact-points (P'1 and P'2) side by side in a line, as shown in FIG. 20B. That is, the probability of putting the piece of thread between the stationary terminal strip 30 and both contacts 23 would be expressed by 14°/360°, i.e., about ¹⁄₂₆, in case of the arrangement of the contact-points (P1 and P2) of FIG. 20A. On the other hand, in case of the arrangement of the contact-points (P'1 and P'2) of FIG. 20B, such a probability would be expressed by 24°/360°, i.e., ¹⁄₁₅.

For providing a stable connection between the plug 3 and socket 2, the plug 3 has a chucking device. The chucking device comprises a pair of chucking buttons 47 integrally molded with the plug housing 40, and chucking members 70 having hooks 71. Since each of the chucking buttons 47 is connected to the plug housing 40 through a hinge 48, it can be rotated about a pivot axis of the hinge 48 to attach the chucking member 70 to the plug 3, as shown in FIG. 21. The hooks 71 of the chucking members 70 can be engaged with hook engaging portions 16 formed in the concave 11 of the socket housing 10 when the plug 3 is connected to the socket 2. For example, the hook 71 has a round face 72, as shown in FIG. 22. In this case, since each of the hooks 71 can be smoothly removed from the engaging portion 16, it is possible to prevent a breakage or deformation of the chucking members 70 even when the plug 3 is pulled from the socket 2 with an excess amount of force. Numeral 49 designates guide rails formed on the convex 41 which are fitted to grooves 15 of the concave 11 to smoothly insert the convex into the concave.

As a modification of this embodiment, it is possible to use a socket 2B having a movable terminal member 20B shown in FIG. 23 in place of the socket 2. The movable terminal member 20B is formed with a base plate 21B to be fixed to a socket housing 10B and a pair of torsion arms 22B extending from the base plate 21B. The torsion arms 22B have contacts 23B, respectively, which are urged against a stationary terminal strip 30B to make a first electrical connection between the movable terminal member 20B and a stationary terminal strip 30B. When a plug 3B is connected to the socket 2B, the torsion arms 22B are pushed by a top end portion of a convex 41B of the plug 3B such that the contacts 23B are spaced away from the stationary terminal strip 30B to brake the first electrical connection. Another features and objects of this modification are identical to those of the above embodiment. Therefore, no duplicate explanation to common parts is deemed necessary. Like parts are designated by numerals with a suffixed letter of In the above embodiment and modification, the socket (2 and 2B) is mounted in the radiotelephone having the internal power supply such as a Ni-Cd rechargeable battery. However, it is possible to mount the socket (2 and 2B) in a portable radiotelephone using a separated battery pack. The battery pack is detachably mounted on the radiotelephone. In case of using such a radiotelephone in a car, a first operation of the radiotelephone with the use of the battery pack would be switched to a second operation thereof with the use of an external power supply carried in the car by connecting the plug (3 and 3B) to the socket (2 and 2B) without removing the battery pack from the radiotelephone.

What is claimed is:

1. A connector comprising a socket adapted to be mounted in a portable electric appliance having an internal power supply and a plug used for supplying electric power from an external power supply to said electric appliance, said connector capable of switching between a first operation of said electric appliance with the use of said internal power supply and a second operation thereof with the use of said external power supply, said connector comprising:

said socket including a socket housing having a recess, a pair of socket terminals, and movable and stationary terminals, said movable and socket terminals projecting in said recess, said movable terminal being urged against a stationary terminal to make a first electrical connection therebetween for providing said first operation; and said plug including a plug housing having a protrusion and switching means, and a pair of plug terminals, said plug terminals being arranged in said protrusion such that, when said protrusion is inserted into said recess, said plug terminals are connected to said socket terminals to make a second electrical connection therebetween for providing said second operation, said switching means being formed with an inclined wall of said protrusion, along which said movable terminal is moved so as to be spaced away from said stationary terminal to break said first electrical connection in response to the insertion of said protrusion into said recess;

wherein said movable terminal is formed with a pair of torsion members each of which has a contact, and said contacts are disposed such that a first contact-point between one of said contacts and said stationary terminal is displaced from a second contact-point between the other contact and said stationary terminal in an inserting direction of said protrusion into said recess; and wherein said stationary terminal has a pair of pointed projections, to which said contacts are urged, respectively.

2. A connector comprising a socket adapted to be mounted in a portable electric appliance having an internal power supply and a plug used for supplying electric power from an external power supply to said electric appliance, said connector capable of switching between a first operation of said electric appliance with the use of said internal power supply and a second operation thereof with the use of said external power supply, said connector comprising:

said socket including a socket housing having a recess, a pair of socket terminals, and movable and stationary terminals, said movable and socket terminals projecting in said recess, said movable terminal being urged against a stationary terminal to make a first electrical connection therebetween for providing said first operation; and said plug including a plug housing having a protrusion and switching means, and a pair of plug terminals, said plug terminals being arranged in said protrusion such that, when said protrusion is inserted into said recess, said plug terminals are connected to said socket terminals to make a second electrical connection therebetween for providing said second operation, said switching means being formed with an inclined wall of said protrusion, along which said movable terminal is moved so as to be spaced away from said stationary terminal to break said first electrical connection in response to the insertion of said protrusion into said recess;

wherein said movable terminal is formed with a pair of torsion members each of which has a contact, and said contacts are disposed such that a first contact-point between one of said contacts and said stationary terminal is displaced from a second contact-point between the other contact and said stationary terminal in an inserting direction of said protrusion into said recess; and wherein an angle of said inclined wall with respect to said inserting direction is 45 degrees or more.

3. A connector comprising a socket adapted to be mounted in a portable electric appliance having an internal power supply and a plug used for supplying electric power from an external power supply to said electric appliance, said connector capable of switching between a first operation of said electric appliance with the use of said internal power supply and a second operation thereof with the use of said external power supply, said connector comprising:

said socket including a socket housing having a recess, a pair of socket terminals, and movable and stationary terminals, said movable and socket terminals projecting in said recess, said movable terminal being urged against a stationary terminal to make a first electrical connection therebetween for providing said first operation; and said plug including a plug housing having a protrusion and switching means, and a pair of plug terminals, said plug terminals being arranged in said protrusion such that, when said protrusion is inserted into said recess, said plug terminals are connected to said socket terminals to make a second electrical connection therebetween for providing said second operation, said switching means being formed with an inclined wall of said protrusion, along which said movable terminal is moved so as to be spaced away from said stationary terminal to break said first electrical connection in response to the insertion of said protrusion into said recess;

wherein said movable terminal is formed with a pair of torsion members each of which has a contact; and wherein said stationary terminal has a pair of pointed projections, to which said contacts are urged, respectively.

4. A connector comprising a socket adapted to be mounted in a portable electric appliance having an internal power supply and a plug used for supplying electric power from an external power supply to said electric appliance, said connector capable of switching between a first operation of said electric appliance with the use of said internal power supply and a second operation thereof with the use of said external power supply, said connector comprising:

said socket including a socket housing having a recess, a pair of socket terminals, and movable and stationary terminals, said movable and socket terminals projecting in said recess, said movable terminal being urged against a stationary terminal to make a first electrical connection therebetween for providing said first operation; and said plug including a plug housing having a protrusion and switching means, and a pair of plug terminals, said plug terminals being arranged in said protrusion such that, when said protrusion is inserted into said recess, said plug terminals are connected to said socket terminals to make a second electrical connection therebetween for providing said second operation, said switching means being formed with an inclined wall of said protrusion, along which said movable terminal is moved so as to be spaced away from said stationary terminal to break said first electrical connection in response to the insertion of said protrusion into said recess;

wherein said movable terminal is formed with a pair of torsion members each of which has a contact; and wherein an angle of said inclined wall with respect to said inserting direction is 45 degrees or more.

5. A connector as set forth in claim 1, 2, 3, or 4, wherein said inclined wall of said protrusion is configured such that said second electrical connection is made prior to breaking said electrical connection when said plug is connected to said socket.

6. A connector as set forth in claim 1, 2, 3, or 4, wherein said inclined wall of said protrusion is configured such that said first electrical connection is broken prior to making said second electrical connection when said plug is connected to said socket.

7. A connector as set forth in claim 1, 2, 3 or 4, wherein said movable terminal is also displacable along the insertion direction by contacting an inclined wall of the plug such that the contacts are moved along a wiping travel while keeping an electrical connection so as to present a cleaning effect.

\* \* \* \* \*